US007606845B2

United States Patent
Cannon et al.

(10) Patent No.: US 7,606,845 B2
(45) Date of Patent: Oct. 20, 2009

(54) APPARATUS, SYSTEMS, AND METHOD FOR CONCURRENT STORAGE TO AN ACTIVE DATA FILE STORAGE POOL, COPY POOL, AND NEXT POOL

(75) Inventors: David Maxwell Cannon, Tucson, AZ (US); Howard Newton Martin, Vail, AZ (US); Rosa Teslller Plaza, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 11/457,421

(22) Filed: Jul. 13, 2006

(65) Prior Publication Data

US 2008/0016130 A1 Jan. 17, 2008

(51) Int. Cl.
*G06F 17/30* (2006.01)
(52) U.S. Cl. ...................................... 707/204; 711/162
(58) Field of Classification Search .......... 700/201–204
See application file for complete search history.

(56) References Cited

U.S. PATENT DOCUMENTS

| | | | |
|---|---|---|---|
| 6,505,216 B1 * | 1/2003 | Schutzman et al. ......... 707/204 |
| 6,721,766 B1 * | 4/2004 | Gill et al. ..................... 707/204 |
| 6,834,324 B1 | 12/2004 | Wood .......................... 711/111 |
| 6,915,315 B2 * | 7/2005 | Autrey et al. ................ 707/204 |
| 6,959,368 B1 | 10/2005 | St. Pierre et al. ............ 711/162 |
| 6,978,282 B1 * | 12/2005 | Dings et al. .................. 707/204 |
| 2004/0078534 A1 | 4/2004 | Scheid ........................ 711/162 |
| 2004/0199714 A1 | 10/2004 | Estakhri et al. ............. 711/103 |
| 2006/0129770 A1 | 6/2006 | Martin |

* cited by examiner

*Primary Examiner*—Mohammad Ali
*Assistant Examiner*—Huawen Peng
(74) *Attorney, Agent, or Firm*—Kunzler & McKenzie

(57) ABSTRACT

An apparatus, system, and method are disclosed for concurrent storage to an active data file storage pool, copy pool, and next pool. A copy module copies one or more data files from a client to a storage pool that is configured to store active data files. In addition, the copy module may concurrently copy the data files to a copy pool that is configured to backup the storage pool and stores active and inactive data files. The copy module further concurrently copies the data files to a next pool that is configured to offload one or more data files from the storage pool and may store active and inactive data files. In one embodiment, a migration module migrates one or more inactive data files from the storage pool to the next pool by deleting the inactive data files from the storage pool.

14 Claims, 10 Drawing Sheets

APPARATUS, SYSTEMS, AND METHOD FOR CONCURRENT STORAGE TO AN ACTIVE DATA FILE STORAGE POOL, COPY POOL, AND NEXT POOL

BACKGROUND OF THE INVENTION

1. Field of the Invention

This invention relates to concurrent storage and more particularly relates to concurrent storage to an active data file storage pool, a copy pool, and a next pool.

2. Description of the Related Art

A data processing system often backs up data from one or more elements of the system to a storage subsystem. For example, the data processing system may include a plurality of clients. Clients may store data on storage devices such as hard disk drives that are co-located with each client. The data processing system may back up the data from the client storage devices to the storage subsystem.

The storage subsystem may include one or more storage devices organized into a plurality of storage pools. A storage pool may be configured as a logical volume on a magnetic tape drive, a hard disk drive, an optical storage device, a micromechanical storage device, or the like. Client data may be backed up by being copied to a storage pool.

Ideally, the data processing system should back up the most current client data files to a storage pool to assure that the most current instance of the client data is available for restoration to the client. In addition, backed up data should be available for rapid restoration to a client if the client requires the backed data.

Unfortunately, storing backup copies of a plurality of data instances on a storage pool may increase the time required to restore an active instance of client data from the storage pool to the client, particularly when the storage pool comprises a sequential media such as magnetic tape. As a result, a most recent backup copy of a client data file, referred to herein as an active data file, may be stored to a storage pool configured to store active data files. The storage pool may be configured as an active data file storage pool (ADFSP). Because the ADFSP stores active data files, an active data file may be more quickly restored from the ADFSP.

An active data file may become an inactive data file when a subsequent copy of the client data file is backed up and/or when the client data file is deleted from the client. As a result, the storage subsystem may migrate the now inactive data file from the ADFSP to a next storage pool configured to store active data files and inactive data files. The next storage pool is referred to herein as the next pool.

The storage subsystem may migrate an inactive data file by copying the inactive data file to the next pool and deleting the inactive data file from the ADFSP. In addition, the storage subsystem may also back up the active data files of ADFSP to a copy storage pool, referred to herein as a copy pool.

The storage subsystem may also aggregate the active data files into an aggregate file stored on the ADFSP. When one or more data files of an aggregate file becomes inactive, the storage subsystem may reclaim the storage space of the now inactive data file by creating a new aggregate file that does not contain the inactive data files, migrating the original aggregate file to the next pool, and deleting the original aggregate file from ADFSP.

Unfortunately, the operations of migrating inactive data files from the ADFSP, backing up the ADFSP, and reclaiming aggregate files may each require significant storage subsystem bandwidth and time intervals to complete. As a result, the time available for performing backup, migration, and reclamation operations may be reduced.

From the foregoing discussion, it should be apparent that a need exists for an apparatus, system, and method that concurrently perform copying for backup, migration, and reclamation tasks. Beneficially, such an apparatus, system, and method would free storage subsystem bandwidth for performing the tasks.

SUMMARY OF THE INVENTION

The present invention has been developed in response to the present state of the art, and in particular, in response to the problems and needs in the art that have not yet been fully solved by currently available data copy methods. Accordingly, the present invention has been developed to provide an apparatus, system, and method for copying one or more data files to multiple pools that overcome many or all of the above-discussed shortcomings in the art.

The apparatus to copy one or more data files to multiple pools is provided with a plurality of modules configured to functionally execute the steps of copying one or more data files to a storage pool, concurrently copying the data files to a copy pool, and concurrently copying the data files to a next pool. These modules in the described embodiments include a copy module. The apparatus may also include a reclamation module, a restoration module, a migration module, and an aggregation module.

The copy module copies one or more data files from a client to a storage pool of a storage subsystem. The storage pool may be an ADFSP. In one embodiment, the storage pool only stores active data files. In addition, the copy module concurrently copies the data files to a copy pool. The copy pool is configured to backup the storage pool. The copy module further concurrently copies the data files to a next pool. The next pool may be configured to offload data files from the storage pool.

In one embodiment, the migration module migrates one or more inactive data files from the storage pool. The inactive data files may be active data files that become inactive when a subsequent active data file instance is created by a client and/or when the client data file is deleted from the client. The migration module migrates the inactive data files by deleting the inactive data files from the storage pool. In one embodiment, the migration module does not copy the inactive data files prior to deleting the inactive data files as part of the migration, but instead uses instance of the data files concurrently copied to the next pool.

The restoration module restores the one or more data files from the storage pool to the client. In one embodiment, the restoration module restores the data files from the next pool to the client. Alternatively, the restoration module may restore the data files from the copy pool.

In one embodiment, the aggregation module aggregates a plurality of data files into an aggregate file. The aggregate file may be referenced by the storage subsystem using a single database entry. In addition, the aggregate file may include an index to the plurality of data files. In one embodiment, the aggregation module aggregates a first aggregate file into a second aggregate file. The aggregation module may not include one or more inactive data files of the first aggregate file in the second aggregate file.

In one embodiment, the reclamation module reclaims the first aggregate file. The reclamation module may reclaim the first aggregate file by reclaiming the deleted storage space of the first aggregate file in the storage pool, and more particularly by reclaiming the storage space of one or more inactive data files within the first aggregate module. In a certain embodiment, the reclamation module reclaims the first aggregate file by deleting the first aggregate file from the storage pool. The reclamation module may not copy the first aggregate file as part of the reclamation before deleting the first aggregate file.

The apparatus concurrently performs the copy portions of backup, migration, and reclamation operations. Concurrently copying one or more data files to the storage pool, copy pool, and next pool eliminates the need to copy the data files during subsequent backup, migration, and reclamation operations, reducing the bandwidth demands on the storage subsystem.

A system of the present invention is also presented to copy one or more data files to multiple pools. The system may be embodied in a storage subsystem. In particular, the system, in one embodiment, includes a storage pool, a next pool, and a storage manager. The system may also include a copy pool.

The storage pool stores active data files. The storage pool may be configured as an ADFSP. In addition, the storage pool may be a magnetic tape drive, a hard disk drive, an optical storage device, a micromechanical storage device, or the like.

The copy pool may back up the storage pool. In addition, the copy pool may be a magnetic tape drive, a hard disk drive, an optical storage device, a micromechanical storage device, or the like. The copy pool may store active and inactive data files.

The next pool offloads one or more data files from the storage pool. In addition, the next pool may store active and inactive data files. The next pool may be a magnetic tape drive, a hard disk drive, an optical storage device, a micromechanical storage device, or the like. In one embodiment, the storage pool and next pool are organized in a storage hierarchy, with the storage pool occupying a higher position within the hierarchy.

The storage manager manages the storage pool, the copy pool, and the next pool. In addition, the storage manager includes a copy module, and migration module. The copy module copies one or more data files from a client to the storage pool, concurrently copies the data files to the copy pool, and concurrently copies the data files to the next pool. The migration module migrates one or more active and/or inactive data files from the storage pool to the next pool by deleting the data files from the storage pool.

The storage manager may also include an aggregation module, a reclamation module, and a restoration module. The aggregation module may aggregate a plurality of data files into a first aggregate file. In addition, the aggregation module may aggregate the first aggregate file into a second aggregate file that does not include at least one data file of the first aggregate file.

In one embodiment, the reclamation module reclaims the first aggregate file by deleting the first aggregate file from the storage pool. The restoration module may restore one or more data files to the client. The system concurrently copies the one or more data files to the storage pool, the copy pool, and the next pool, substantially reducing the need for subsequent copies to support migration, reclamation, and backup operations.

A method of the present invention is also presented for copying one or more data files to multiple pools. The method in the disclosed embodiments substantially includes the steps to carry out the functions presented above with respect to the operation of the described apparatus and system. In one embodiment, the method includes copying one or more data files to a storage pool, concurrently copying the data files to a copy pool, and concurrently copying the data files to a next pool. The method also may include migrating the data files, aggregating data files as an aggregate file, and reclaiming the aggregate file.

A copy module copies one or more data files from a client to a storage pool that is configured to store active data files. In addition, the copy module concurrently copies the data files to a copy pool that is configured to backup the storage pool and stores active and inactive data files. The copy module further concurrently copies the data files to a next pool that is configured to offload data files from the storage pool and may store active and inactive data files.

In one embodiment, a migration module migrates one or more inactive data files from the storage pool to the next pool by deleting the inactive data files from the storage pool. An aggregation module may aggregate a plurality of files into a first aggregate file. In one embodiment, the aggregation module and a reclamation module reclaim the first aggregate file wherein the aggregation module aggregates the active data files of the first aggregate file to a second aggregate file and the reclamation module deletes the first aggregate file. The method concurrently copies the one or more data files to the storage pool, copy pool, and next pool to reduce subsequent copying of the data files.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention concurrently copies one or more data files to multiple pools. In addition, the embodiment of the present invention may reduce subsequent copying of the data files. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
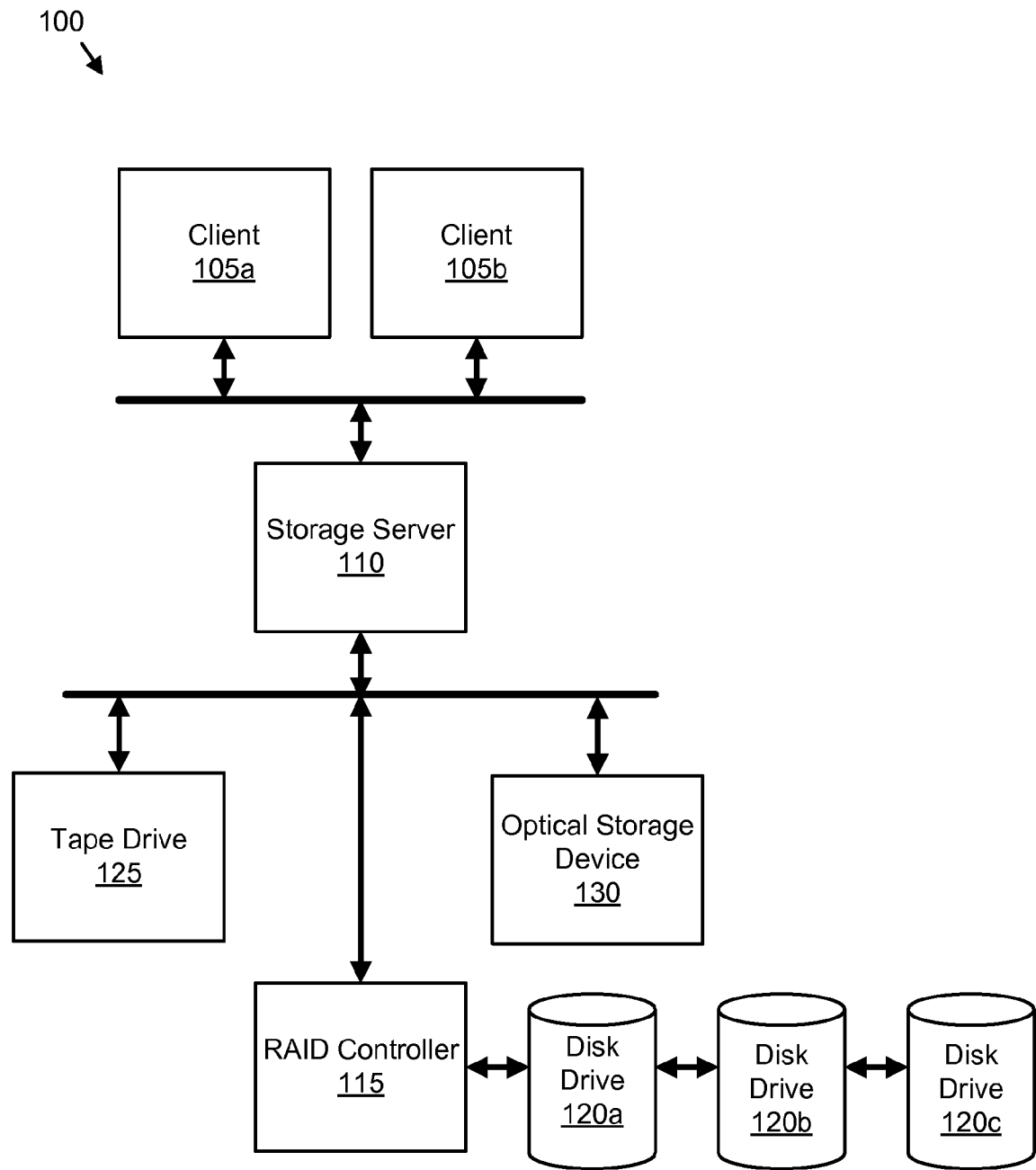
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes one or more clients 105, a storage server 110, a tape drive 125, a redundant array of independent disks (RAID) controller 115, one or more disk drives 120, and an optical storage device 130. Although for simplicity the system 100 is depicted with two clients 105, one storage server 110, one tape drive 125, one RAID controller 115, three disk drives 120, and one optical storage device 130, any number of clients 105, storage servers 110, tape drives 125, RAID controllers 115, disk drives 120, and optical storage devices 130 may be employed.

The tape drive 125, RAID controller 115 and disk drives 120, and optical storage device 130 are collectively referred to herein as storage devices. In addition, the system 100 may include one or more alternate storage devices including micromechanical storage devices, semiconductor storage devices, or the like.

In one embodiment, the storage server 110 may backup data from the clients 105. In one example, the storage server 110 may copy one or more data files from a first client 105a to a storage device such as the tape drive 125. If the first client 105a subsequently requires the data files, the storage server 110 may copy the data files from the tape drive 125 to the first client 105. In one embodiment, the storage server 110 copies all data files from a client 105 to a storage device. In an alternate embodiment, the storage server 110 copies each data file that is modified subsequent to a previous backup to the storage device.

The storage devices may also store data directly for the clients 105. In one example, the RAID controller 115 may store database data for the clients on the disk drives 120. The RAID controller 115 may store the database data as redundant data as is well known to those skilled in the art.

The system 100 may organize the storage devices as a plurality of storage pools as will be discussed hereafter. A pool may include a portion of a storage device such as the optical storage device 130, a tape mounted on the tape drive 125, and the like. The system 100 may organize the pools as a storage hierarchy, as will be described hereafter. In addition, the system 100 may move data between pools to provide additional data protection through redundancy.

The system 100 may require available bandwidth if the system is to be able to restore data files from the clients 105 in a timely manner. In addition, the system 100 may require available bandwidth in order to store data for the clients 105. Unfortunately, the bandwidth required to move data between pools and backup and restore data files may exceed the available bandwidth of the system 100. The embodiment of the present invention reduces the bandwidth demands on the system 100 by performing concurrent copies of data files.

Figure 2:
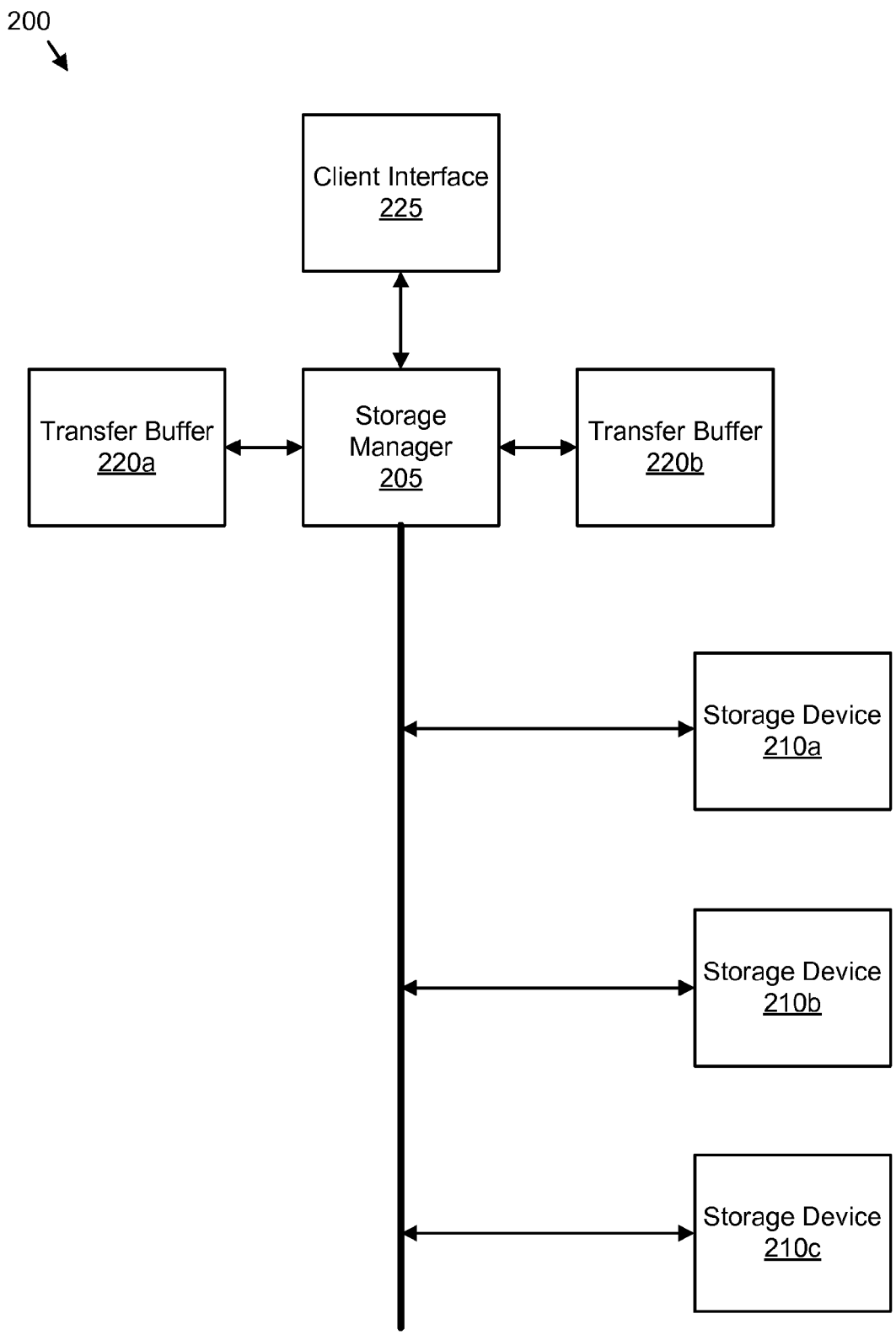
FIG. 2 is a schematic block diagram illustrating one embodiment of a storage subsystem in accordance with the present invention.

FIG. 2 is a schematic block diagram illustrating one embodiment of a storage subsystem 200 in accordance with the present invention. The storage subsystem 200 includes a storage manager 205, one or more storage devices 210, one or more transfer buffers 220, and a client interface 225. In one embodiment, the system 100 of FIG. 1 embodies the storage subsystem 100. In one example, the storage server 110 may be configured as the storage manager 205, while the RAID controller 115 with disk drives 120, tape drives 125, and optical storage device 130 may be configured as the storage devices 210. The description of the storage subsystem 200 refers to elements of FIG. 1, like numbers referring to like elements.

In one embodiment, the storage manager 205 organizes the storage devices 210 into a plurality of pools. Each pool may comprise one or more logical volumes and/or one or more storage devices 210 as is well known to those skilled in the art. In one embodiment, the storage manager 205 organizes a storage pool that is configured to store active data files. In one embodiment, an active data file is the most recently backed up instance of a client data file. For example, the storage manager 205 may copy a client data file from the client 105 to the storage pool as an active data file. The copy of the client data file is an active data file until the storage manager 205 copies a subsequent instance of the client data file to the storage pool.

In one example, a first storage device 210a may be organized as the storage pool. However, any number of storage devices 210 may embody the storage pool. In one embodiment, the storage pool is configured as an ADFSP.

In addition, the storage manager 205 may organize a copy pool that is configured to backup the storage pool. Continuing the above example, a second storage device 210b may be organized as the copy pool, although any number of storage devices 210 may embody the copy pool. The copy pool may be configured to store active and inactive data. In one embodiment, copies of client data files become inactive when the client data files are subsequently backed up to a new active data file, and/or when the client data files are deleted from the client 105.

The storage manager 205 may further organize a next pool. The next pool may offload data files from the storage pool, and may store active and inactive data files. Thus the next pool may offload inactive data files from the storage pool so that the storage pool only stores active data files Continuing the above example, a third storage device 210c may be organized as the next pool.

The storage manager 205 may receive one or more data files from a client 105 through the client interface 225. In one embodiment, the storage manager 205 copies the data files from the client 105. Alternatively, the client 105 may transmit the data files to the storage manager 205. The storage manager 205 may store the data files in a transfer buffer 220. In addition, the storage manager 205 may copy the data files from the transfer buffer 220 to the pools.

Figure 3:
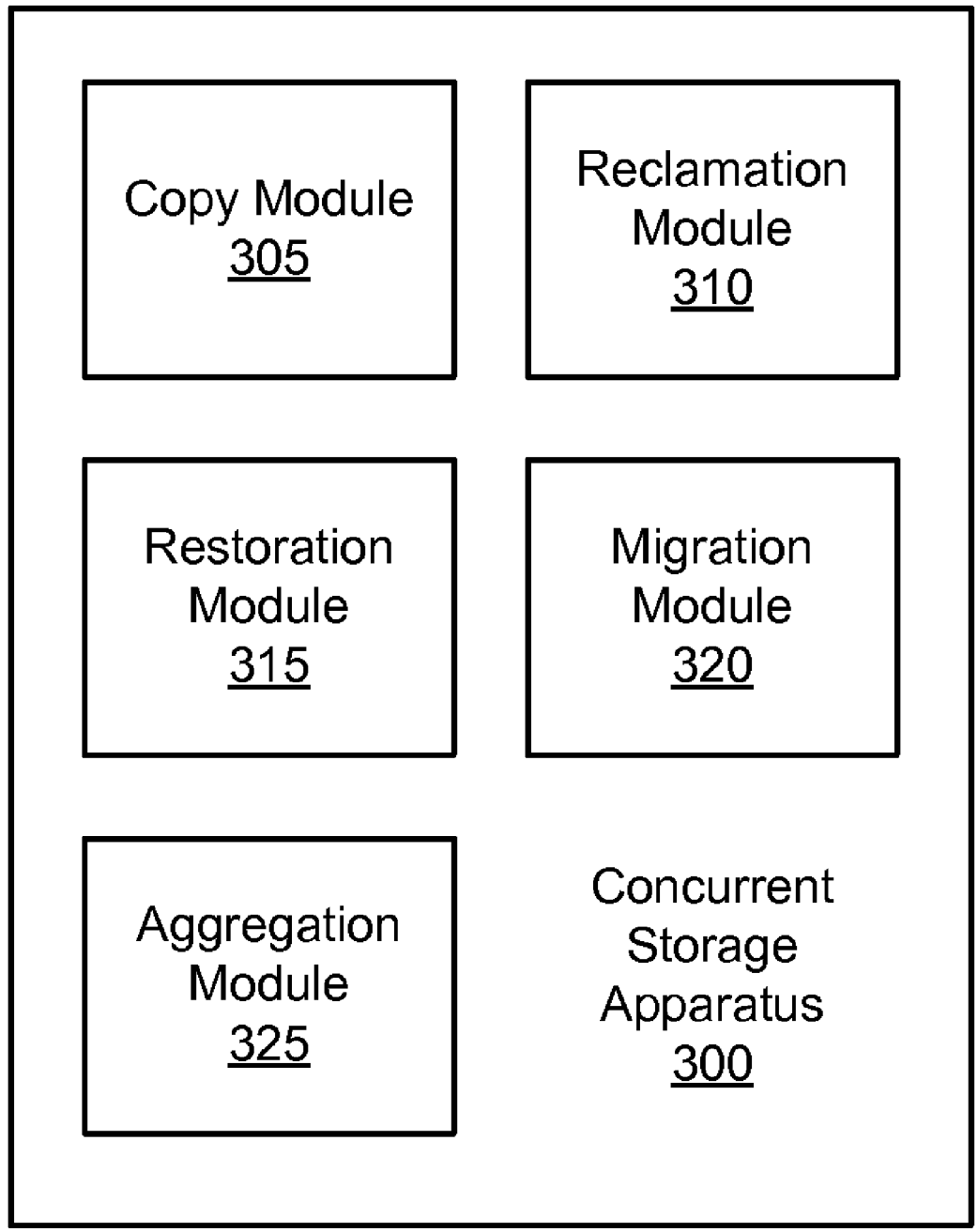
FIG. 3 is a schematic block diagram illustrating one embodiment of a concurrent storage apparatus of the present invention.

FIG. 3 is a schematic block diagram illustrating one embodiment of a concurrent storage apparatus 300 of the present invention. The apparatus 300 may be embodied by the storage manager 205 of FIG. 2. In addition, the description of the apparatus 300 refers to elements of FIGS. 1-2, like numbers referring to like elements. The apparatus 300 includes a copy module 305, reclamation module 310, restoration module 315, migration module 320, and aggregation module 325.

The copy module 305 copies one or more data files from a client 105 to a storage pool of a storage subsystem 200 as will be described hereafter. The storage pool may be an ADFSP. In one embodiment, the storage pool only stores active data files. In addition, the copy module 305 concurrently copies the data files to a copy pool. The copy module 305 further concurrently copies the data files to a next pool.

In one embodiment, the migration module 320 migrates one or more active and/or inactive data files from the storage pool to the next pool. The restoration module 315 may restore the data files from the storage pool to the client 105. In one embodiment, the restoration module 315 restores the data files from the next pool to the client 105. Alternatively, the restoration module 315 may restore the data files from the copy pool to the client 105.

In one embodiment, the aggregation module 325 aggregates a plurality of data files into an aggregate file. The storage manager 205 may reference the aggregate file using a single data base entry. Thus the aggregate file appears to the storage manager 205 as a single data file. The aggregate file may be copied and communicated as a single data file, reducing management demands on the storage manager 205. In addition, the aggregate file may include an index to the plurality of data files. In one embodiment, the storage manager 205 stores data files in the pools as aggregate files.

In a certain embodiment, the aggregation module 325 aggregates a first aggregate file into a second aggregate file. The aggregation module 325 may not include one or more inactive data files of the first aggregate file in the second aggregate file.

In one embodiment, the reclamation module 310 reclaims the storage space of the first aggregate file. The reclamation module 310 may reclaim the first aggregate file by deleting the first aggregate file from the storage pool. The reclamation module 310 may not copy the first aggregate file as part of the reclamation of the first aggregate file before deleting the first aggregate file.

Figure 4:
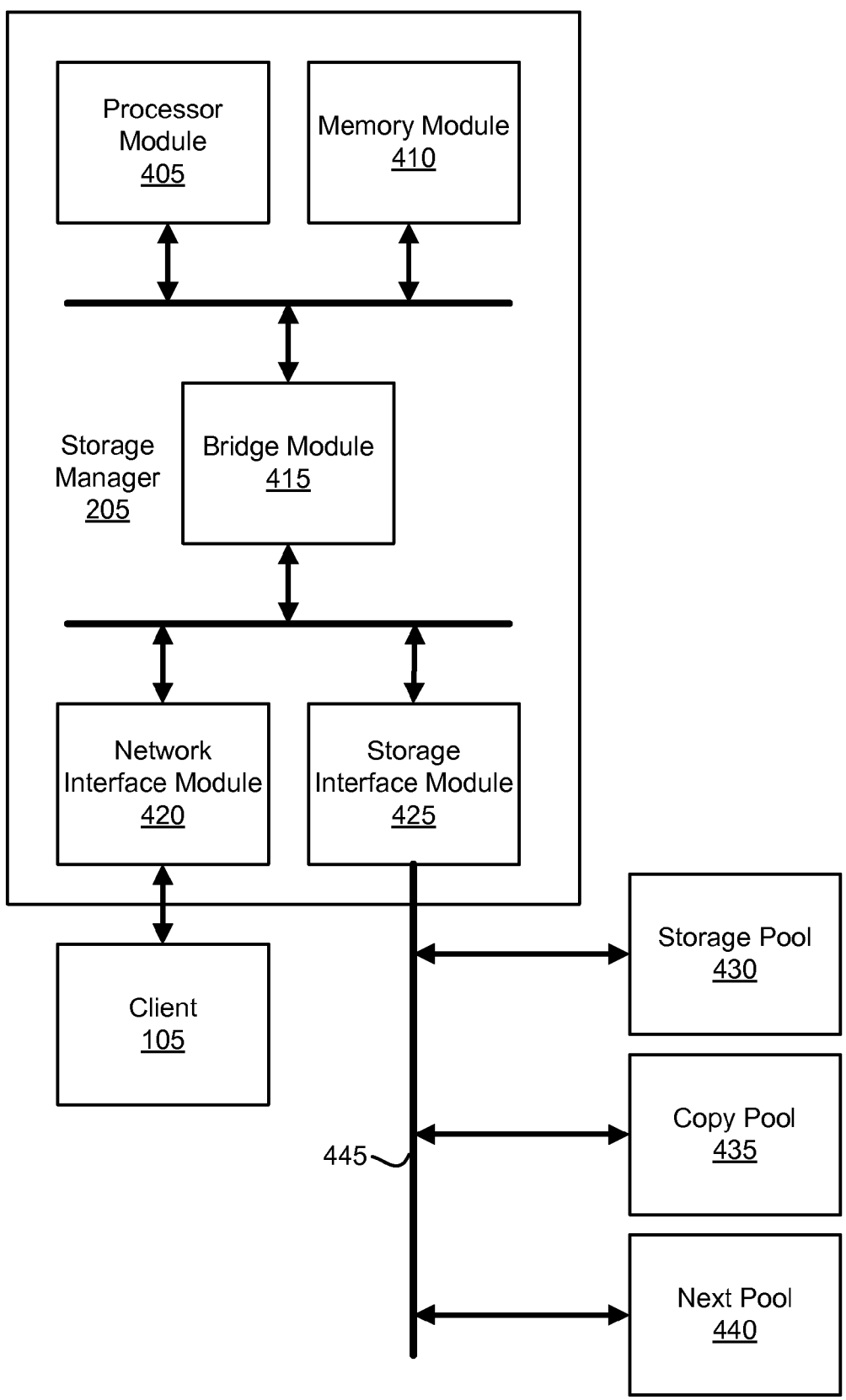
FIG. 4 is a schematic block diagram illustrating one embodiment of a storage manager of the present invention.

FIG. 4 is a schematic block diagram illustrating one embodiment of a storage manager 205 of the present invention. The storage manager 205 may be the storage manager 205 of FIG. 2. In addition, the description of the storage manager 205 refers to elements of FIGS. 1-3, like numbers referring to like elements. The storage manager 205 includes a processor module 405, a memory module 410, a bridge module 415, a network interface module 420, and a storage interface module 425. The network interface module 420 is shown in communication with a client 105. The storage interface module 425 is depicted in communication with a storage pool 430, a copy pool 435, and a next pool 440.

The processor module 405, memory module 410, bridge module 415, network interface module 420, and storage interface module 425 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the network interface module 420, and the storage interface module 425 may be through semiconductor metal layers, substrate to substrate wiring, circuit card traces, and/or wires connecting the semiconductor devices.

The memory module 410 stores software instructions and data. The processor module 405 executes the software instructions and manipulates the data as is well know to those skilled in the art. The processor module 405 communicates with the network interface module 420 and the storage interface module 425 through the bridge module 415.

The client interface 225 may include the network interface module 420. The network interface module 420 may be configured as an Ethernet interface, a token ring interface, or the like. The storage interface module 425 may also be configured as an Ethernet interface, a token ring interface or the like in communication with a similarly configured data channel 445. The storage pool 430, copy pool 435, and next pool 440 may be configured as one or more logical volumes. Each logical volume may be organized as portions of one or more storage devices 210 as is well known to those skilled in the art.

In one embodiment, the memory module 410 stores and the processor module 405 executes one or more software processes comprising the copy module 205, reclamation module 310, restoration module 315, migration module 320, and aggregation module 325. The memory module 410 may also be configured as the transfer buffer 220 of FIG. 2.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
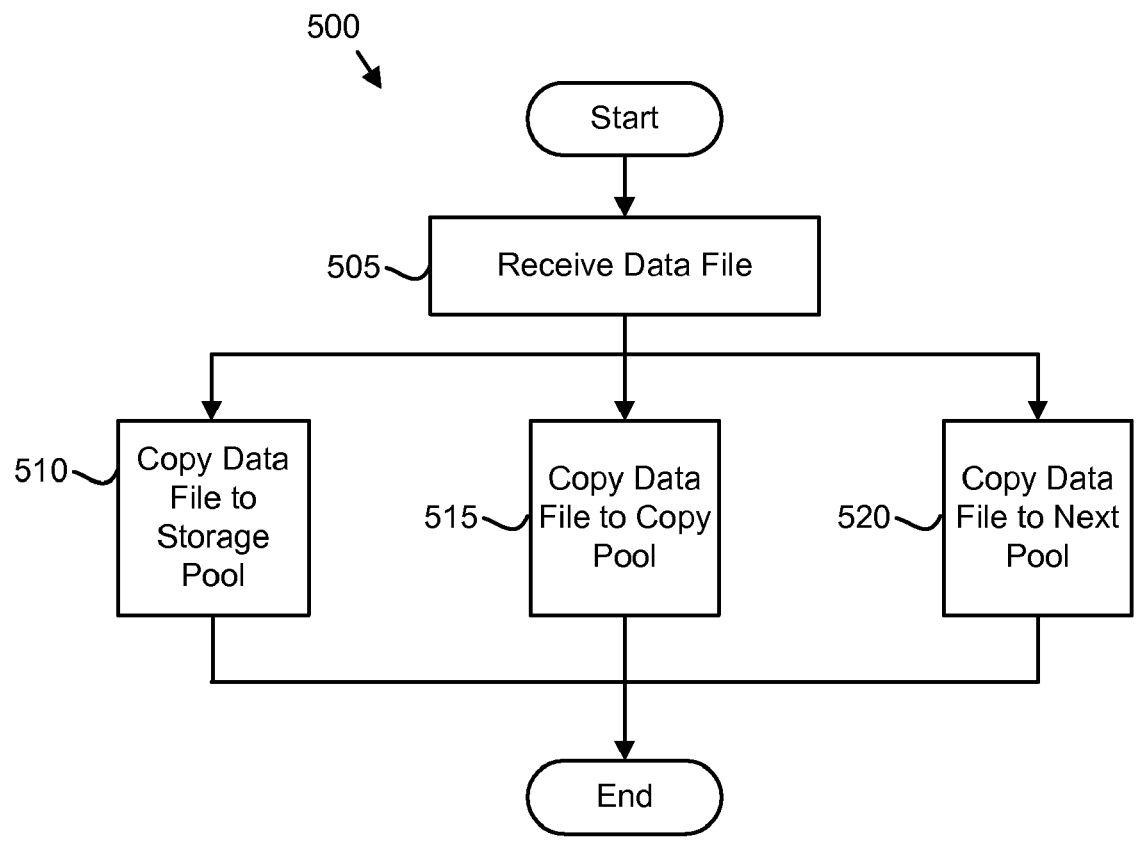
FIG. 5 is a schematic flow chart diagram illustrating one embodiment of a concurrent copy method of the present invention.

FIG. 5 is a schematic flow chart diagram illustrating one embodiment of a concurrent copy method 500 of the present invention. The method 500 substantially includes the steps to carry out the functions presented above with respect to the operation of the described systems 100, 200 and apparatus 300, 400 of FIGS. 1-4. In addition, the description of the method 500 refers to elements of FIGS. 1-4, like numbers referring to like elements.

The method 500 begins and in one embodiment, the storage manager 205 receives 505 one or more data files from a client 105. The storage manager 205 may temporarily store the data files in the transfer buffer 220.

The copy module 305 copies 510 the data files to the storage pool 430. In addition, the copy module 305 concurrently copies 515 the data files to the copy pool 435. The copy module 305 further concurrently copies 520 the data files to a next pool 440 and the method 500 terminates.

In one embodiment, the storage manager 205 writes the data files from the transfer buffer 220 concurrently to storage pool 430, copy pool 435, and next pool 440. In one example, the storage manager 205 directs the storage pool 430, copy pool 435, and next pool 440 each to receive the data files from the data channel 445. The method 500 concurrently copies 510, 515, 520 the data files to the storage pool 430, copy pool 435, and next pool 440 to reduce subsequent copying of the data files as will be described hereafter.

Figure 6:
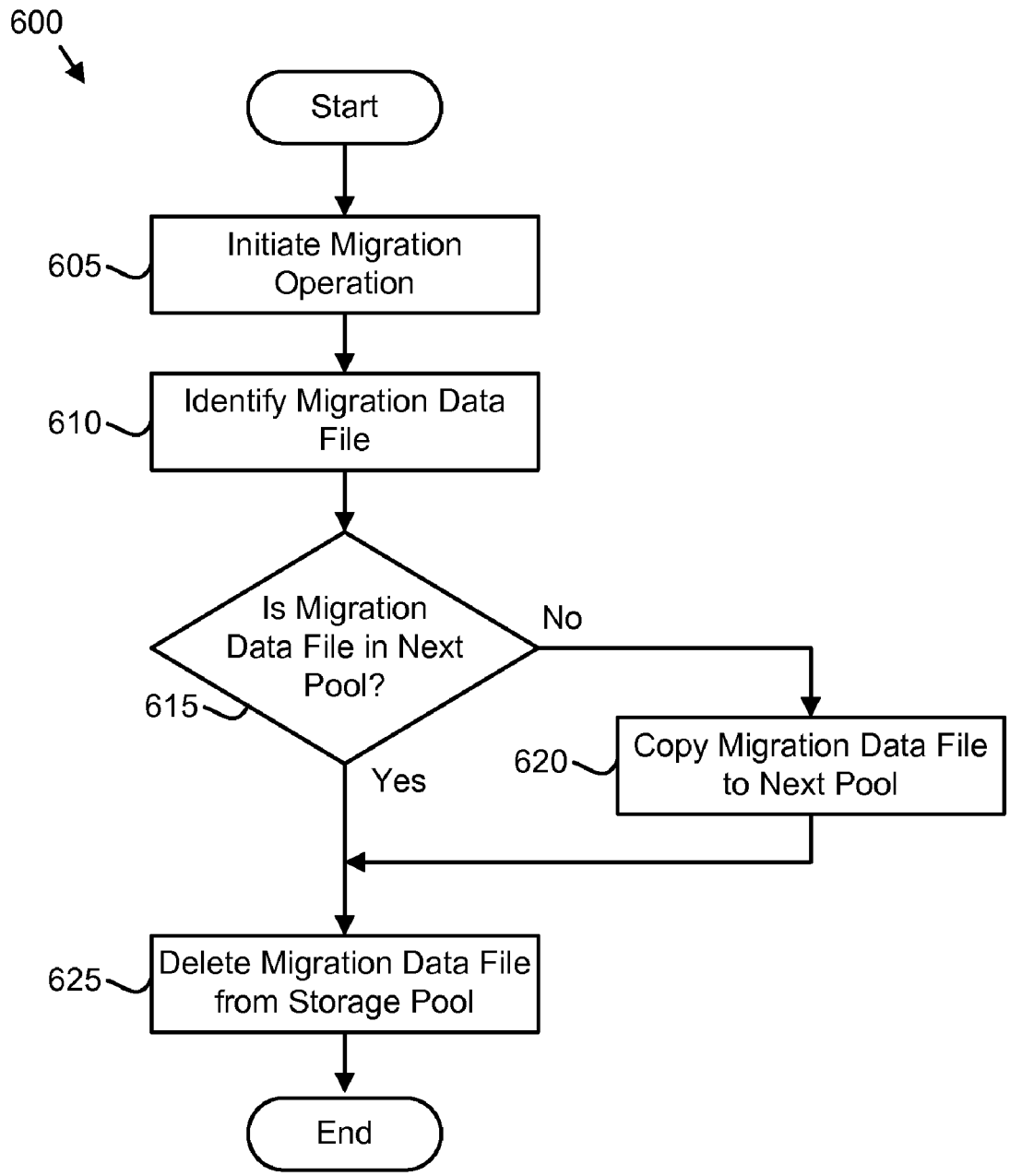
FIG. 6 is a schematic flow chart diagram illustrating one embodiment of a migration method of the present invention.

FIG. 6 is a schematic flow chart diagram illustrating one embodiment of a migration method 600 of the present invention. The description of the method 600 refers to elements of FIGS. 1-5, like numbers referring to like elements.

The method 600 begins, and in one embodiment the storage manager 205 initiates 605 a migration operation. The storage manager 205 may periodically initiate 605 the migration operation. Alternatively, the storage manager 205 may initiate 605 the migration operation when the storage pool 430 exceeds a specified threshold of used storage space.

The migration module 320 may identify 610 one or more migration data file candidates in the storage pool 430. The migration data file candidates are referred to herein as migration data files. In one embodiment, the migration data files are inactive data files. The migration module 320 may identify 610 the migration data files when subsequent active instances of the migration data files are copied 510 to the storage pool 430.

The migration module 320 determines 615 if the migration data files are in the next pool 440. If the migration module 320 determines 615 that the migration data files are not in the next pool 440, the migration module 320 copies 620 the migration data files to the next pool 440. If the migration module 320 determines 615 that the migration data files are in the next pool 440 and/or when the migration data file is copied 620 to the next pool 440, the migration module 320 deletes the migration data files from the storage pool 430 and the method 600 terminates.

In one embodiment, the migration module 320 always determines 615 that the migration data file resides in the next pool 440 as the a result of the copy module 305 copying 520 the instances of the migration data files to the next pool 440 as described in FIG. 5. Therefore, the storage subsystem 200 bandwidth used by the migration method 600 is reduced as the data files may only be communicated across the data channel 445 during the concurrent copy method 500.

Figure 7:
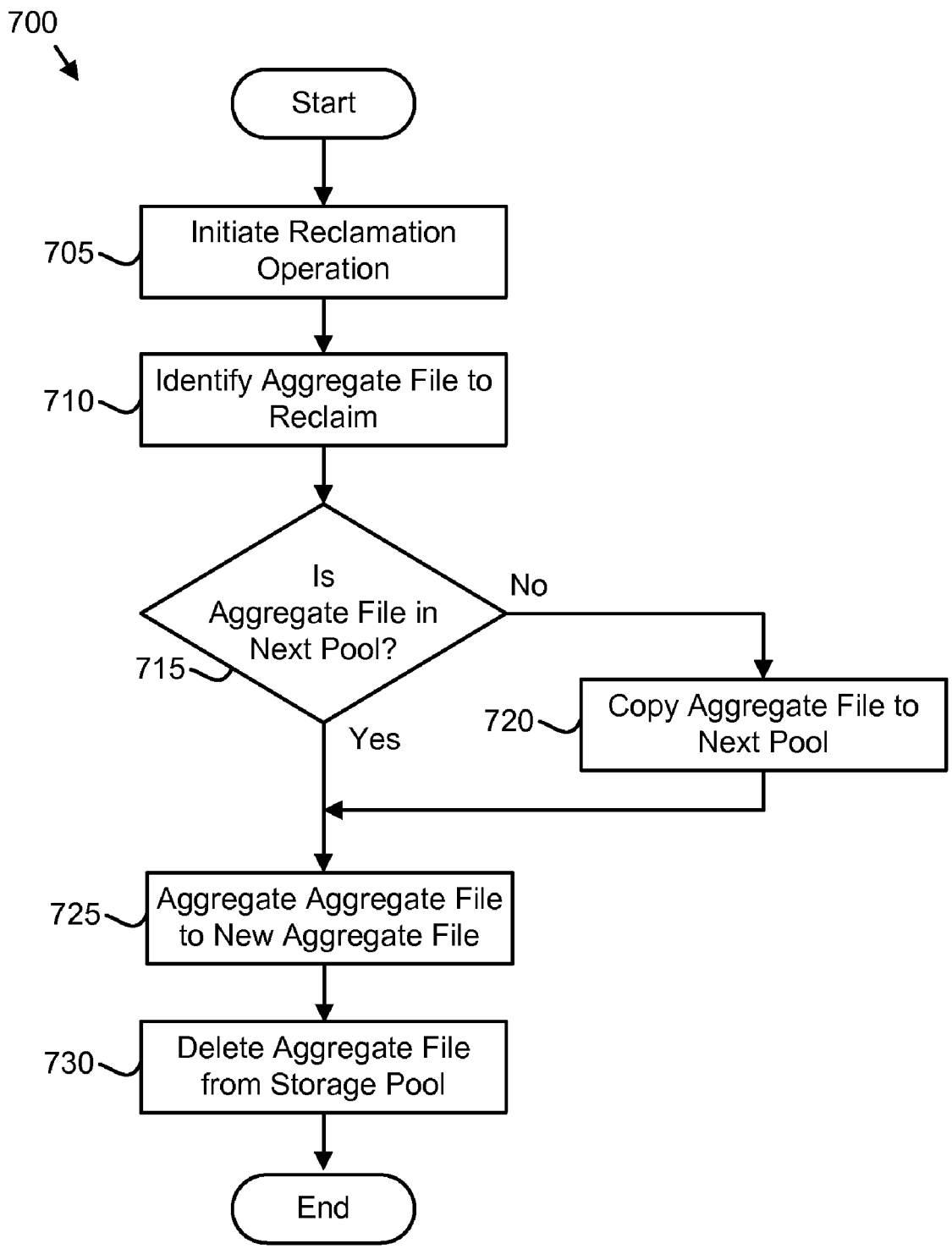
FIG. 7 is a schematic flow chart diagram illustrating one embodiment of a reclamation method of the present invention.

FIG. 7 is a schematic flow chart diagram illustrating one embodiment of a reclamation method 700 of the present invention. The description of the method 700 refers to elements of FIGS. 1-6, like numbers referring to like elements.

The method 700 begins and in one embodiment, the storage manager 205 initiates 705 a reclamation operation. The storage manager 205 may initiate 705 the reclamation operation when additional storage space is needed in the storage pool 230. Alternatively, the storage manager 205 may periodically initiate 705 the reclamation operation.

The reclamation module 310 may identify 710 an aggregate file to reclaim. In one embodiment, the reclamation module 310 identifies 710 the aggregate file that includes at least one inactive data file.

In one embodiment, the reclamation module 310 determines 715 if the aggregate file is in the next pool 440. If the reclamation module 310 determines 715 that the aggregate file is not in the next pool 440, the reclamation module 310 may copy 720 the aggregate file to the next pool 440.

If the reclamation module 310 determines 715 that the aggregate file is in the next pool 440 and/or when the aggregation file is copied 720 to the next pool 440, the aggregation module 325 aggregates 725 the aggregate file to a new aggregate file. In one example, the aggregation module 325 aggregates 725 the active data files of a first aggregate file to a second new aggregate file. The second new aggregate file may not include the inactive data files of the first aggregate file.

In one embodiment, the reclamation module 310 always determines 715 that the aggregate file resides in the next pool 440 as the a result of the copy module 305 copying 520 the instances of the each data file to the next pool 440 as described in FIG. 5 and the aggregation module 325 aggregating the data files of the next pool 440. Therefore, the storage subsystem 200 bandwidth used by the reclamation method 700 is reduced as the data file may only be communicated across the data channel 445 during the concurrent copy method 500.

The reclamation module 310 further deletes 730 the aggregate file from the storage pool 430 and the method 700 terminates. The reclamation module 310 does not delete 730 the aggregate file from the storage pool 430 unless an aggregate file instance with the inactive data files exists in the next pool 440 so that the next pool 440 includes a copy of the inactive data files. Continuing the example above, the reclamation module 310 may delete 730 the first aggregate file from the storage pool 430 while the second aggregate file resides on the storage pool 430. Thus the storage space in the storage pool 430 occupied by the inactive data files of the first aggregate file is reclaimed.

Figure 8:
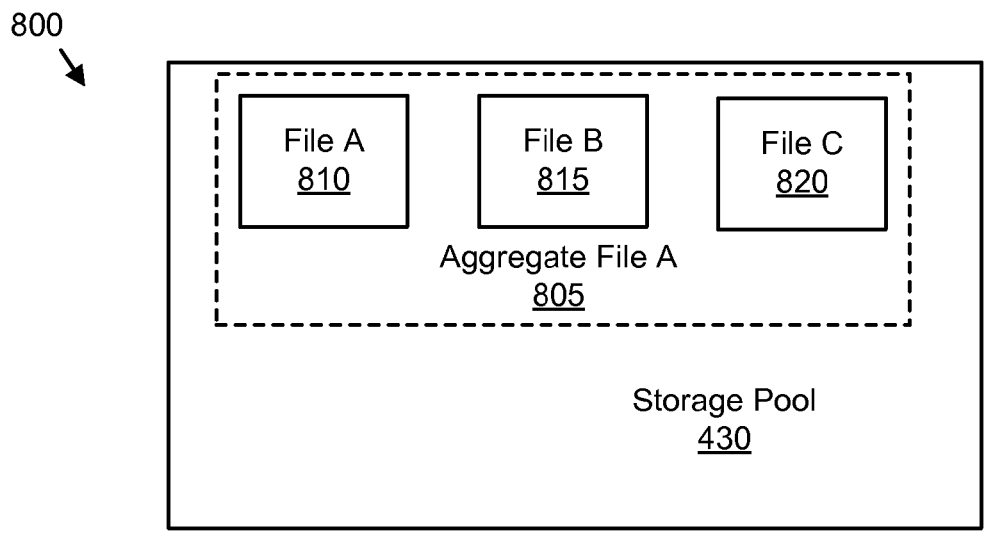
FIG. 8 is a schematic block diagram illustrating one embodiment of pools in an initial state prior to a concurrent copy of the present invention.
Figure 8:
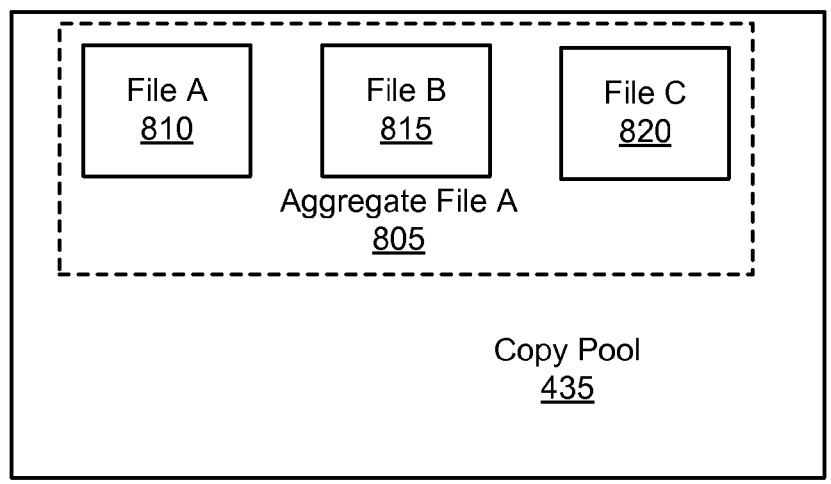
Figure 8:
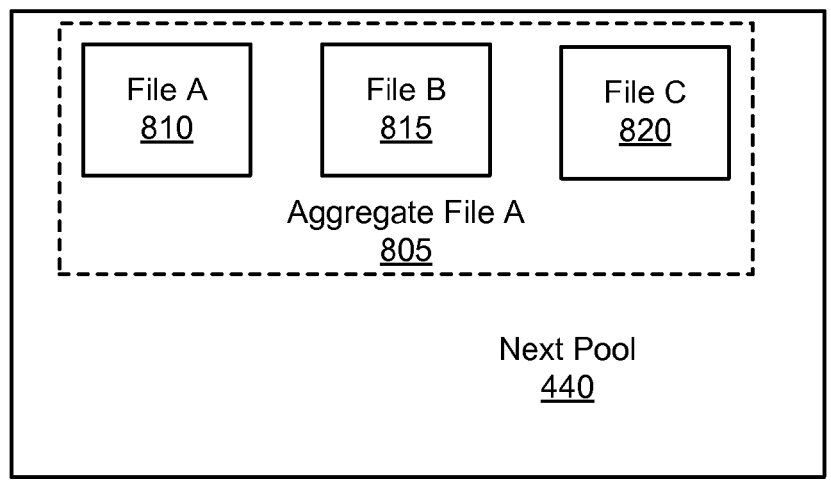

FIG. 8 is a schematic block diagram illustrating one embodiment of pools 800 in an initial state of the present invention. The description of the pools 800 refers to elements of FIGS. 1-7, like numbers referring to like elements. The pools 800 include the storage pool 430, the copy pool 435, and the next pool 440. In one embodiment, the storage pool 430 is configured as one or more disk drives 120 while the copy pool 435 and next pool are configured as tape drives 125.

In one example, file A 810, file B 815, and file C 820 each reside in the storage pool 430, copy pool 435, and next pool 440. The files 810, 815, 820 may be data files. In addition, the files 810, 815, 820 are aggregated into aggregate file A 805 on the storage pool 430, copy pool 435, and next pool 440. In one embodiment, file A 810, file B 815, and file C 820 are active data files.

Figure 9:
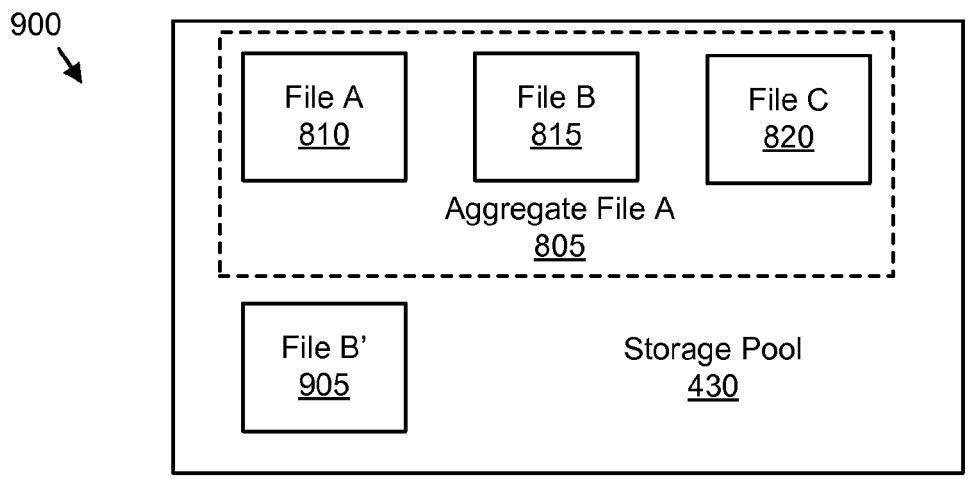
FIG. 9 is a schematic block diagram illustrating one embodiment of pools subsequent to the concurrent copy of the present invention.
Figure 9:
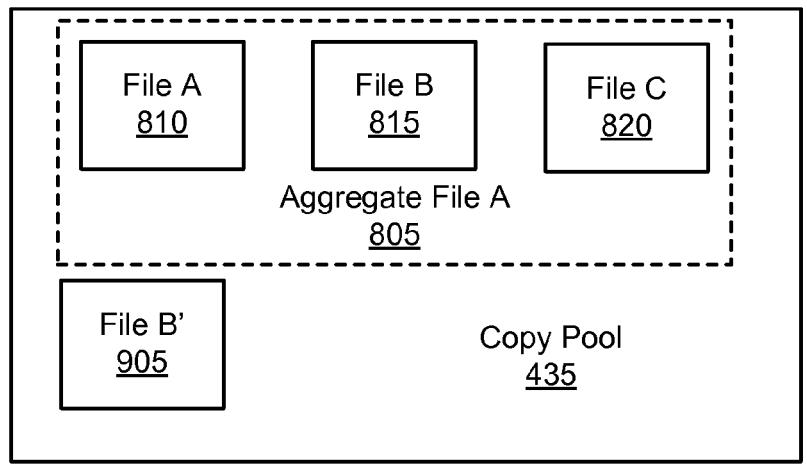
Figure 9:
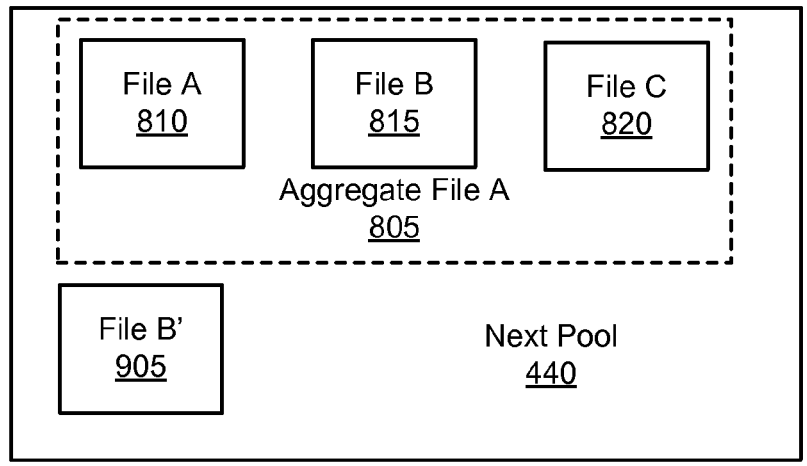

FIG. 9 is a schematic block diagram illustrating one embodiment of pools 900 after a concurrent copy of the present invention. Continuing the example of FIG. 8, the pools 900 and files 805, 810, 815, 820 are the pools 800 and files 805, 810, 815, 820 of FIG. 8 subsequent to the concurrent copy 510, 515, 520 of FIG. 5. The description of the pools 900 refers to elements of FIGS. 1-8, like numbers referring to like elements.

The copy module 305 concurrently copies 510, 515, 520 file B' 905 to the storage pool 430, copy pool 435, and next pool 440. In one embodiment, file B' 905 is a subsequent instance of file B 815. Thus file B' 905 is an active data file and file B 815 is an inactive file.

Figure 10:
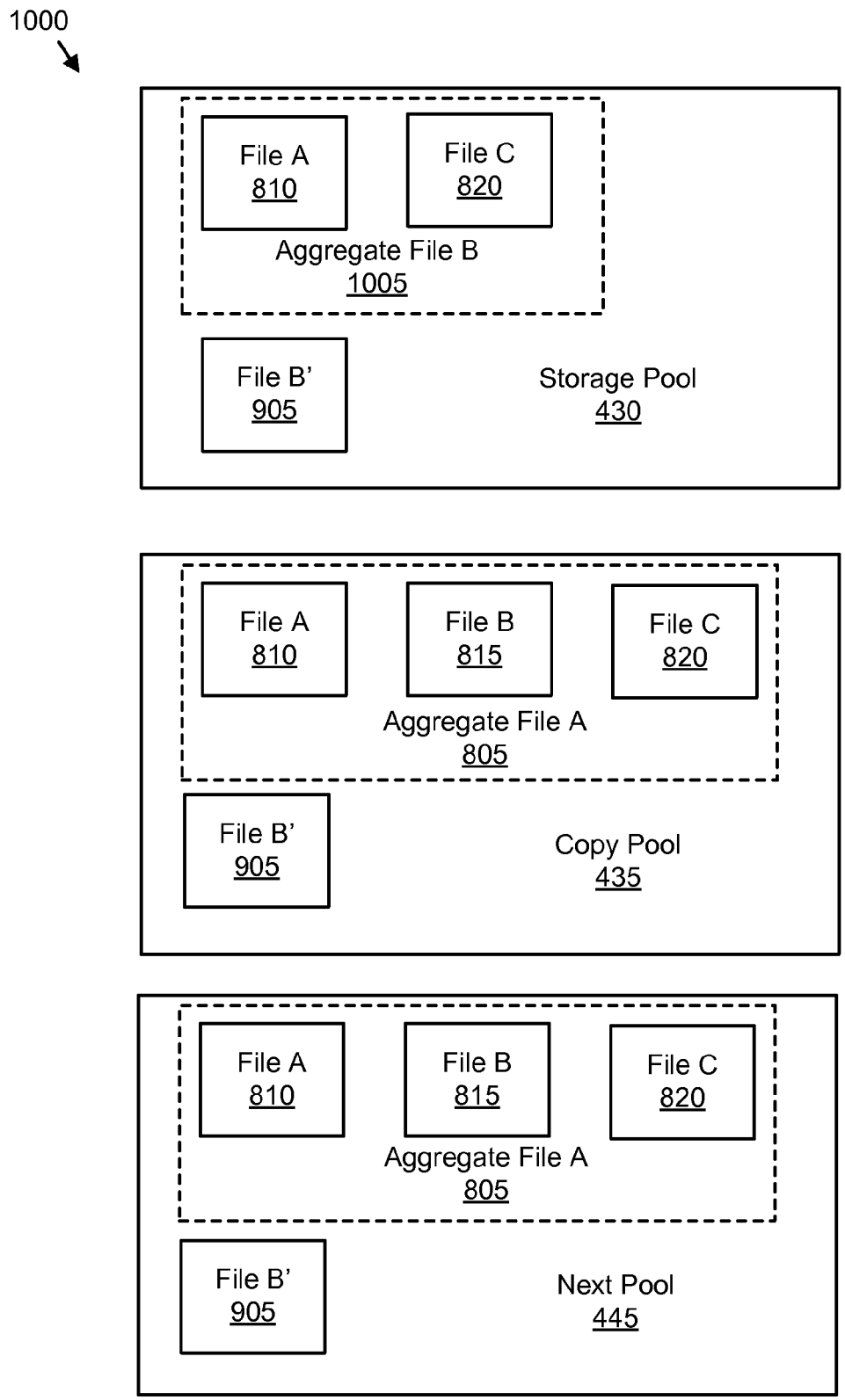
FIG. 10 is a schematic block diagram illustrating one embodiment of pools with a reclaimed storage pool of the present invention.

FIG. 10 is a schematic block diagram illustrating one embodiment of pools 1000 with a reclaimed storage pool 430 of the present invention. Continuing the example of FIGS. 8 and 9, the pools 1000 and files 805, 810, 815, 820, 905 are the pools 900 and files 805, 810, 815, 820, 905 of FIG. 9. The description of the pools 1000 refers to elements of FIGS. 1-9, like numbers referring to like elements.

The aggregation module 325 aggregates 725 aggregate file A 805 into aggregate file B 1005 as part of the reclamation method 700. Aggregate file B 1005 does not include the inactive file B 815. The reclamation module 310 deletes 730 aggregate file A 805 to reclaim the storage space of inactive file B 815 in the storage pool 430. Therefore, the storage pool 430 as depicted only includes active files 810, 820, 905. Because the copy pool 435 and the next pool 440 may store inactive data files, the copy pool 435 and next pool 440 store both file B 815 and file B' 905.

The embodiment of the present invention concurrently copies 510, 515, 520 one or more data files to multiple pools. In addition, the embodiment of the present invention may reduce subsequent copying of the data files.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to concurrently copy one or more data files to multiple pools, the apparatus comprising:
a code storage device storing an executable code;
a processor executing the executable code, the executable code comprising
a copy module copying one or more data files from a client over a data channel in a first write to a storage pool, wherein all communications to the storage pool and a next pool are received from the data channel, the storage pool only stores active data files, and an active data file is a most recently backed up instance of a client data file;
the copy module further concurrently copying the data files in the first write from the data channel to the next pool as the data files are copied from the data channel to the storage pool, wherein the next pool is organized in a storage hierarchy with the storage pool, offloads inactive data files from the storage pool, and stores active and inactive data files, wherein an inactive data file is a previous instance of the client data file;
a migration module deleting first data files from the storage pool in response to a migration operation for moving inactive files from the storage pool to the next pool if the first data files become inactive files subsequent to active instances of the first files being concurrently copied to the storage pool and next pool; and
an aggregation module aggregating a plurality of the data files into a first aggregate file referenced using a single database entry and copied and communicated as a single file, the first aggregate file comprising an index to the plurality of the data files, and the aggregation module further aggregating the first aggregate file into a second aggregate file subsequent to an active instance of a second file being concurrently copied to the storage pool and the next pool wherein the second aggregate file does not comprise an instance of the second file.

2. The apparatus of claim 1, wherein the copy module is further configured to concurrently copy the data files in the first write to a copy pool, wherein the copy pool backs up the storage pool and stores active and inactive data files.

3. The apparatus of claim 1, the copy module further copying the first aggregate file to the next pool subsequent to the aggregation of the first aggregate file and not copying the second aggregate file to the next pool subsequent to the aggregation of the second aggregate file, wherein the second aggregate file and the active instance of the second file reside in the storage pool and the first aggregate file and the active instance of the second file reside in the next pool and the apparatus further comprising a reclamation module reclaiming the first aggregate data file by deleting the first aggregate file from the storage pool subsequent to aggregating the second aggregate file.

4. A semiconductor device storing a computer readable program, wherein the computer readable program when executed on a computer causes the computer to:
copy one or more data files from a client over a data channel in a first write to a storage pool, wherein all communications to the storage pool and a next pool are received from the data channel, the storage pool only stores active data files, and an active data file is a most recently backed up instance of a client data file;
concurrently copy the data files in the first write from the data channel to the next pool as the data files are copied from the data channel to the storage pool, wherein the next pool is organized in a storage hierarchy with the storage pool, offloads inactive data files from the storage pool, and stores active and inactive data files, and wherein an inactive data file is a previous instance of the client data file; and
delete first data files from the storage pool in response to a migration operation for moving inactive files from the storage pool to the next pool if the first data files become inactive files subsequent to active instances of the first files being concurrently copied to the storage pool and next pool;

aggregate a plurality of data files into a first aggregate file referenced using a single database entry and copied and communicated as a single file, the first aggregate file comprising an index to the plurality of the data files; and aggregate the first aggregate file into a second aggregate file subsequent to an active instance of a second file being concurrently copied to the storage pool and the next pool, wherein the second aggregate file does not comprise an instance of the second file.

5. The semiconductor device of claim 4, wherein the computer readable program further causes the computer to concurrently copy the data files in the first write to a copy pool, wherein the copy pool backs up the storage pool and stores active and inactive data files.

6. A method for concurrently copying one or more data files to multiple pools, the method comprising:

copying, by use of a processor, one or more data files from a client over a data channel in a first write to a storage pool, wherein all communications to the storage pool and a next pool are received from the data channel, the storage pool only stores active data files, and an active data file is a most recently backed up instance of a client data file;

concurrently copying, by use of the processor, the data files in the first write from the data channel to the next pool as the data files are copied from the data channel to the storage pool, wherein the next pool is organized in a storage hierarchy with the storage pool, offloads inactive data files from the storage pool, and stores active and inactive data files, wherein an inactive data file is a previous instance of the client data file;

deleting first data files from the storage pool in response to a migration operation for moving inactive files from the storage pool to the next pool if the first data files become inactive files subsequent to active instances of the first files being concurrently copied to the storage pool and next pool;

aggregating a plurality of the data files into a first aggregate file referenced using a single database entry and copied and communicated as a single file, the first aggregate file comprising an index to the plurality of the data files; and aggregating the first aggregate file into a second aggregate file subsequent to an active instance of a second file being concurrently copied to the storage pool and the next pool wherein the second aggregate file does not comprise an instance of the second file.

7. The method of claim 6, further comprising concurrently copying the data files in the first write to a copy pool, wherein the copy pool backs up the storage pool and stores active and inactive data files.

8. The method of claim 6, further comprising restoring the data files from the storage pool to the client.

9. The method of claim 6, wherein the inactive data files are not copied as part of the migration prior to deleting the inactive data file.

10. A system to concurrently copy one or more data files to multiple pools, the system comprising:

a storage pool only storing active data files, wherein an active data file is a most recently backed up instance of a client data file;

a next pool offloading one or more inactive data files from the storage pool and storing active and inactive files, wherein an inactive data file is a previous instance of the client data file;

a data channel in communication with the storage pool and the next pool, wherein all communications to the storage pool and a next pool are received from the data channel;

a storage manager managing the storage pool and next pool and comprising a code storage device storing executable code and a processor executing the executable code, the executable code comprising a copy module copying one or more data files from a client over the data channel in a first write to the storage pool, and concurrently copying the data files in the first write from the data channel to the next pool as the data files are copied from the data channel to the storage pool;

a migration module deleting first data files from the storage pool in response to a migration operation for moving inactive files from the storage pool to the next pool if the first data files become inactive files subsequent to active instances of the first files being concurrently copied to the storage pool and next pool; and an aggregation module aggregating a plurality of the data files into a first aggregate file referenced using a single database entry and copied and communicated as a single file, the first aggregate file comprising an index to the plurality of the data files, and the aggregation module further aggregating the first aggregate file into a second aggregate file subsequent to an active instance of a second file being concurrently copied to the storage pool and the next pool wherein the second aggregate file does not comprise an instance of the second file.

11. The system of claim 10, further comprising a copy pool backing up the storage pool and storing active and inactive data files, and wherein the copy module further concurrently copies the data files in the first write to the copy pool.

12. The semiconductor device of claim 4, wherein the computer readable code further causes the computer to copy the first aggregate file to the next pool subsequent to the aggregation of the first aggregate file and not copy the second aggregate file to the next pool subsequent to the aggregation of the second aggregate file, wherein the second aggregate file and the active instance of the second file reside in the storage pool and the first aggregate file and the active instance of the second file reside in the next pool and the computer readable code further causing the computer to reclaim the first aggregate data file by deleting the first aggregate file from the storage pool subsequent to aggregating the second aggregate file.

13. The method of claim 6, the method further comprising copying the first aggregate file to the next pool subsequent to the aggregation of the first aggregate file and not copying the second aggregate file to the next pool subsequent to the aggregation of the second aggregate file, wherein the second aggregate file and the active instance of the second file reside in the storage pool and the first aggregate file and the active instance of the second file reside in the next pool and the method further comprising reclaiming the first aggregate data file by deleting the first aggregate file from the storage pool subsequent to aggregating the second aggregate file.

14. The system of claim 10, the copy module further copying the first aggregate file to the next pool subsequent to the aggregation of the first aggregate file and not copying the second aggregate file to the next pool subsequent to the aggregation of the second aggregate file, wherein the second aggregate file and the active instance of the second file reside in the storage pool and the first aggregate file and the active instance of the second file reside in the next pool and the computer read program further comprising a reclamation module reclaiming the first aggregate data file by deleting the first aggregate file from the storage pool subsequent to aggregating the second aggregate file.

* * * * *